(12) United States Patent
Zhao et al.

(10) Patent No.: US 9,514,051 B2
(45) Date of Patent: Dec. 6, 2016

(54) CACHE MEMORY WITH UNIFIED TAG AND SLICED DATA

(71) Applicant: VIA ALLIANCE SEMICONDUCTOR CO., LTD., Shanghai (CN)

(72) Inventors: Bo Zhao, Shanghai (CN); Jiin Lai, Shanghai (CN); Zhongmin Chen, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 65 days.

(21) Appl. No.: 14/564,380

(22) Filed: Dec. 9, 2014

(65) Prior Publication Data

US 2016/0147654 A1     May 26, 2016

(30) Foreign Application Priority Data

Nov. 25, 2014    (CN) .......................... 2014 1 0686730

(51) Int. Cl.
    *G06F 12/08*      (2016.01)

(52) U.S. Cl.
    CPC ......... *G06F 12/084* (2013.01); *G06F 12/0864* (2013.01); *G06F 12/0888* (2013.01); *G06F 12/0895* (2013.01); *G06F 2212/222* (2013.01); *G06F 2212/284* (2013.01)

(58) Field of Classification Search
    CPC ............. G06F 12/084; G06F 12/0811; G06F 12/0864; G06F 12/0893; G06F 2212/60; G06F 2212/601; G06F 2212/271; G06F 2212/282; G06F 2212/284
See application file for complete search history.

(56) References Cited

U.S. PATENT DOCUMENTS

| 2003/0154345 A1* | 8/2003 | Lyon | ................ | G06F 12/0864 711/122 |
| 2006/0112228 A1* | 5/2006 | Shen | ................ | G06F 12/084 711/133 |

(Continued)

FOREIGN PATENT DOCUMENTS

TW      201333820 A     8/2013

OTHER PUBLICATIONS

Lal Shimpi, Anand "Intel's Sandy Bridge Architecture Exposed" Sep. 14, 2010. Accessed on Aug. 20, 2014 from http://www.anandtech.com/show/3922/intels-sandy-bridge-architecture-exposed/4 pp. 1-2.

(Continued)

*Primary Examiner* — Yong Choe
*Assistant Examiner* — Glenn Gossage
(74) *Attorney, Agent, or Firm* — E. Alan Davis; James W. Huffman

(57) ABSTRACT

A cache memory is shared by N cores of a processor. The cache memory includes a unified tag part and a sliced data part partitioned into N data slices. Each data slice of the N data slices is physically local to a respective one of the N cores and physically remote from the other N-1 cores. For each core, the cache memory biases allocations caused by the core towards a physically local slice of the core. The cache memory may be arranged as a set-associative cache memory, and allocations may be based on a miss rate of a data slice and a number of M ways allocated to a core. A dispatch queue dispatches requests in a schedule fashion so that only one of the N data slices at a time returns data to each core.

16 Claims, 4 Drawing Sheets

(56) References Cited

U.S. PATENT DOCUMENTS

| | | | |
|---|---|---|---|
| 2006/0179229 A1* | 8/2006 | Clark | G06F 12/0811 711/129 |
| 2010/0250856 A1* | 9/2010 | Owen | G06F 12/084 711/128 |
| 2013/0151782 A1* | 6/2013 | Liu | G06F 12/0831 711/130 |
| 2013/0246825 A1* | 9/2013 | Shannon | G06F 1/3275 713/324 |
| 2014/0052918 A1* | 2/2014 | Khailany | G06F 12/0859 711/122 |
| 2015/0178199 A1* | 6/2015 | Wang | G06F 12/084 711/122 |
| 2016/0055086 A1* | 2/2016 | Fan | G06F 12/0848 711/121 |

OTHER PUBLICATIONS

Ozdemir, Serkan et al. "Yield-Aware Cache Architectures" The 39th Annual IEEE/ACM International Symposium on Microarchitecture (MICRO'06) Accessed on Aug. 20, 2014 at http://www.ece.northwestern.edu/~memik/courses/452/presentations/rel_3.pdf pp. 1-11.

* cited by examiner

CACHE MEMORY WITH UNIFIED TAG AND SLICED DATA

CROSS REFERENCE TO RELATED APPLICATION(S)

This application claims priority to China Application No. 201410686730, filed Nov. 25, 2014, which is hereby incorporated by reference in its entirety.

BACKGROUND

In the current design of a multi-core processor with a cache memory, keeping cache coherency and memory consistency is a problem that must be solved. Some implementations use a shared bus, and some use a shared last level cache (LLC). In general, a shared LLC is used in an application that requires high memory performance, where the LLC may be a level-2 or level-3 cache. The latency and throughput of the pipeline is an important measure of performance of the shared LLC. It is desirable to decrease latency while keeping the throughput high.

BRIEF SUMMARY

In one aspect the present invention provides a cache memory shared by N cores. The cache memory includes a unified tag part and a sliced data part, wherein the sliced data part is partitioned into N data slices. Each data slice of the N data slices is physically local to a respective one of the N cores and physically remote from the other N-1 cores, wherein N is an integer greater than one. For each core of the N cores, the cache memory biases allocations caused by the core towards a physically local slice of the core, wherein the physically local slice is one of the N data slices and is physically local to the core.

In another aspect, the present invention provides a method for use with a cache memory shared by N cores, the cache memory comprising a unified tag part and a sliced data part partitioned into N data slices, wherein each data slice of the N data slices is physically local to a respective one of the N cores and physically remote from the other N-1 cores, wherein N is an integer greater than one. The method includes, in response to a request from a core of the N cores for data from the cache memory, first accessing the unified tag part to determine whether an address of the request hit in the unified tag part, subsequently accessing the one of the N data slices if the address of the request hits in the unified tag part, and returning the data to the core from the accessed one of the N data slices with an access latency that is smaller when the accessed one of the N data slices is the one of the N data slices physically local to the core than when the accessed one of the N data slices is one of the N data slices physically remote to the core.

In yet another aspect, the present invention provides a processor. The processor includes N cores, wherein N is an integer greater than one. The processor also includes a cache memory set-associatively arranged as M ways. M is an integer at least as great as N. The N cores share the cache memory. The cache memory includes a unified tag part that maintains data coherency among the N cores. For each way of the M ways and each core of the N cores, the way has a latency associated with providing data to the core, wherein the associated latency varies among different combinations of the M ways and N cores. For each core of the N cores, the cache memory biases allocations for the core towards ways of the M ways that have a lowest latency associated with providing data to the core.

DETAILED DESCRIPTION OF THE EMBODIMENTS

Glossary

A data slice (or simply, slice) in this invention is a storage structure configured to store data cached from system memory. The slice may include an array of memory cells, for example.

A slice is a physically local (or simply, local) slice of a core if it is physically closer to the core than to any of the other cores, which results in the latency between the core and its physically local slice being smaller than the latency between the physically local slice and the other cores. The other slices are denoted as physically remote (or simply, remote) slices of the core.

Figure 1:
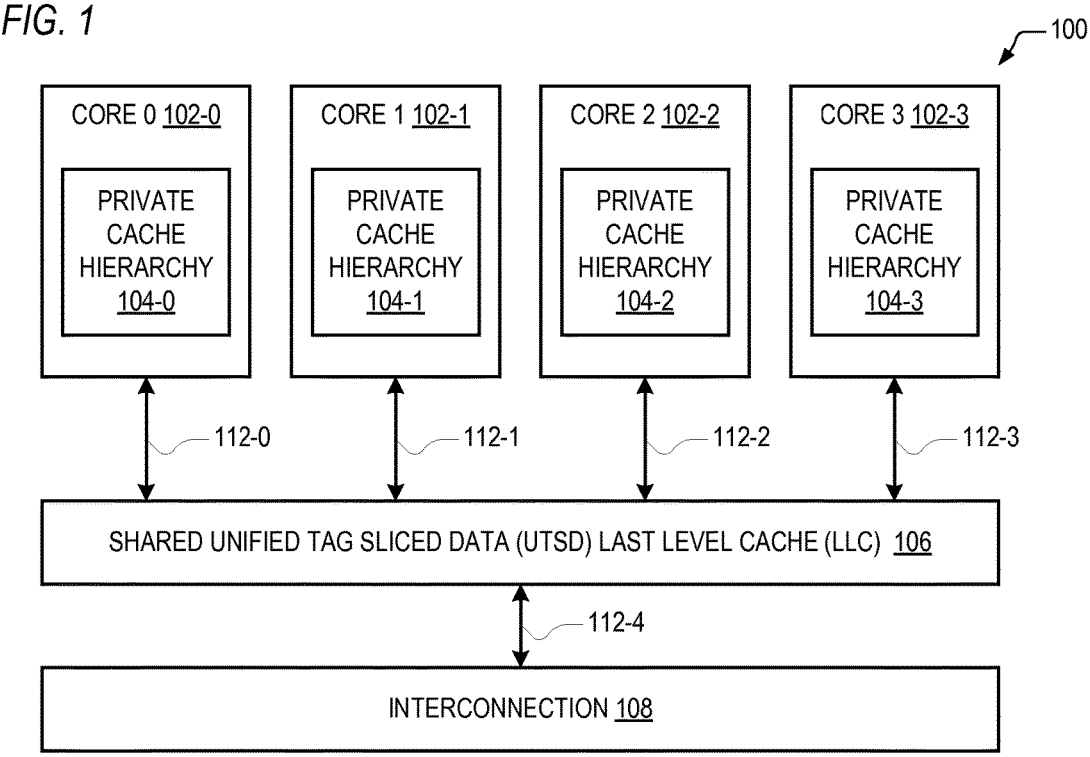
FIG. 1 is a block diagram illustrating a multi-core processor.

Referring now to FIG. 1, a block diagram illustrating a multi-core processor 100 is shown. The processor 100 includes multiple processing cores 102, an interconnection 108 (also referred to as bus interface unit 108), and a shared unified tag sliced data (UTSD) last level cache (LLC) memory 106. In the example embodiment of FIG. 1, there are four cores 102 denoted core 0 102-0, core 1 102-1, core 2 102-2 and core 3 102-3, which are collectively referred to as cores 102 and generically individually referred to as core 102. Each of cores 102-0, 102-1, 102-2, 102-3 accesses the UTSD LLC 106 via a respective load/store interface 112-0, 112-1, 112-2, 112-3, which are referred to collectively as load/store interfaces 112 and generically individually as load/store interface 112. The bus interface unit 108 also accesses the UTSD LLC 106 via a load/store interface 112-4. The processor 100 is part of a larger computing system (not shown) that includes system memory and peripherals (also not shown), with which the UTSD LLC 106 communicates via the bus interface unit 108. Although the embodiment of FIG. 1 illustrates a processor 100 with four cores 102, other embodiments with different numbers of cores 102 are contemplated, and the number of cores 102 may be considered N, where N is greater than one. And although the embodiment of FIG. 1 illustrates cache memory 106 is a last level cache memory, other embodiments with different types of shared cache memory are contemplated.

All of the cores 102 share the UTSD LLC 106. The UTSD LLC 106 includes a unified tag part (202 of FIG. 2), which maintains data coherence between the cores 102 that share the UTSD LLC 106. However, the data storage part of the UTSD LLC 106 is physically partitioned into N data slices (206 of FIG. 2), each of which is physically located close to a respective core 102. The close physical location of a data slice 206 to its corresponding core 102 advantageously enables the latency of an access by a core 102 to its physically close data slice 206 to be less than the latency of accesses by the core 102 to other data slices 206. Further advantageously, although all the cores 102 share the UTSD LLC 106, the UTSD LLC 106 biases allocations caused by a core 102 toward its physically local slice, which is one of the N data slices 206 and physically close (local) to the core 102. The UTSD LLC 106 and its operation is described in more detail below.

Each of cores 102-0, 102-1, 102-2, 102-3 includes its respective private cache memory hierarchy 104-0, 104-1, 104-2, 104-3, which are referred to collectively as private cache memory hierarchies 104 and generically individually as private cache memory hierarchy 104. Preferably, the cache memories of the private cache memory hierarchies 104 are smaller than the UTSD LLC 106 and have a relatively small access latency. The cores 102 also include functional units that may include, but are not limited to, an instruction cache, an instruction fetch unit, branch prediction units, instruction decoders, instruction translators, microcode, architectural and non-architectural register sets, a rename unit, a reorder buffer, reservation stations, an instruction dispatcher and execution units, which may include integer units, floating point units, media units, branch units, load units and store units. Various microarchitectural features may be included in the cores 102, for example, the cores 102 may be superscalar or scalar and may execute instructions in-order or out-of-order. In one embodiment, the cores 102 conform substantially to the x86 instruction set architecture, although the cores 102 are not limited to a particular instruction set architecture.

Figure 2:
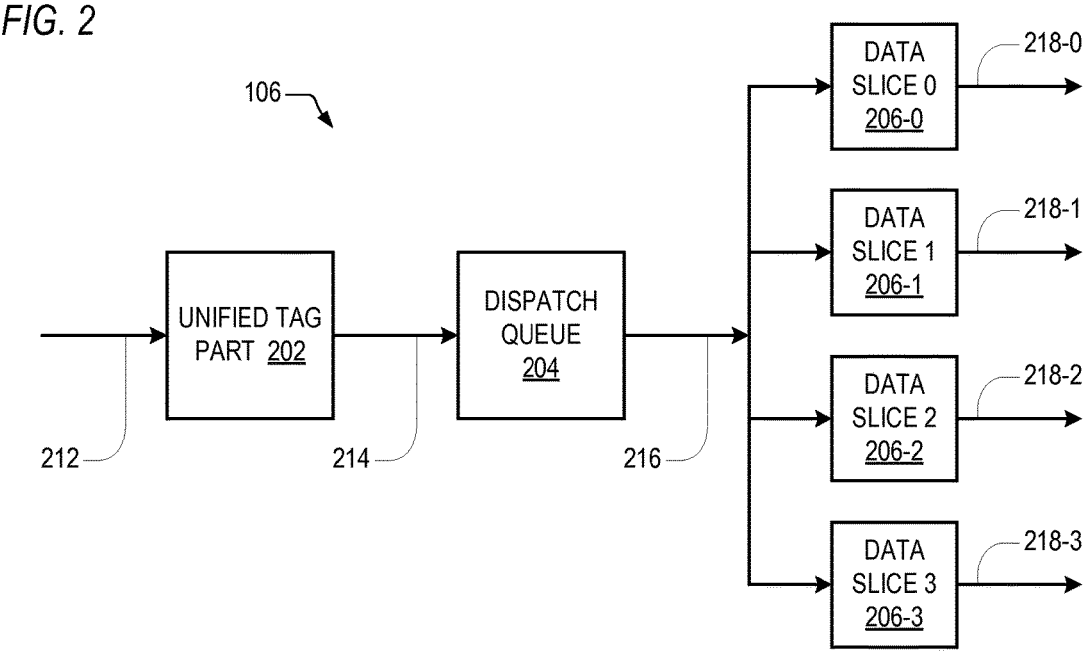
FIG. 2 is a block diagram illustrating the UTSD unified tag sliced data (UTSD) LLC 106 of FIG. 1.

Referring now to FIG. 2, a block diagram illustrating the UTSD LLC 106 of FIG. 1 is shown. The UTSD LLC 106 includes a unified tag part 202, a dispatch queue 204, and a sliced data part, which is partitioned into a plurality of data slices 206. In the example embodiment of FIG. 2, sliced data part of the UTSD LLC 106 is partitioned into four data slices 206 denoted data slice 0 206-0, data slice 1 206-1, data slice 2 206-2, and data slice 3 206-3, which are collectively referred to as data slices 206 and generically individually referred to as data slice 206. The data slices 206 are also referred to simply as slices 206. Preferably, the number of data slices 206 corresponds to the number of cores 102.

Preferably, the UTSD LLC 106 is arranged as a set-associative cache memory having a plurality of ways, referred to as M ways, where M is greater than one. Collectively, the data slices 206 hold all the cache lines of data stored by the UTSD LLC 106. The unified tag part 202 holds the tags, status and other related information associated with the cache lines of data held in the data slices 206. Preferably, the M ways of the UTSD LLC 106 are partitioned among the data slices 206. For example, in the case where N (the number of data slices 206) is 4 and M (the number of ways) is 16, then 4 ways are partitioned to each data slice 206 in an exclusive manner. For example, ways 0-3 may be partitioned to data slice 0 206-0, ways 4-7 may be partitioned to data slice 1 206-1, ways 8-11 may be partitioned to data slice 2 206-2, and ways 12-15 may be partitioned to data slice 3 206-3; whereas, the unified tag part 202 includes all 16 ways.

Each data slice 206 is a storage structure configured to store data cached from system memory. The slice 206 may include an array of memory cells, for example. Each of the data slices 206 is located physically closer to a different one of the cores 102 than the other cores 102. A slice 206 is physically local (or simply, local) to a core 102 if it is physically closer to the core 102 than to any of the other cores 102, which results in the latency between the core 102 and its local slice 206 being smaller than the latency between the local slice 206 and the other cores 102. The other slices 206 are denoted as physically remote (or simply, remote) from the core 102. For example, data slice 0 206-0 is physically local (or simply, local) to core 0 102-0 if it is physically closer to core 0 102-0 than to core 1 102-1, core 2 102-2 and core 3 102-3, which results in the latency between core 0 102-0 and its physically local slice 206-0 being smaller than the latency between slice 206-0 and the other cores 102 (core 1 102-1, core 2 102-2 or core 3 102-3). More specifically, the physical closeness of a local slice 206 to its associated core 102 may enable the latency between the local slice 206 and the core 102 to be less than the latency of a conventional unified data storage structure having the same latency for all cores.

The dispatch queue 204 receives requests by the cores 102 to access the UTSD LLC 106 along with the associated responses 214 from the unified tag part 202 and queues the requests and responses. Preferably, the unified tag part 202 is multi-ported and the UTSD LLC 106 includes multiple tag pipelines that concurrently access the unified tag part 202 to obtain multiple concurrent responses and provide multiple core 102 requests and their associated responses to the dispatch queue 204 concurrently. As described in more detail below, particularly with respect to FIG. 7, the dispatch queue 204 examines the queued requests to determine when to dispatch the requests 216 to the data slices 206. In particular, the dispatch queue 204 ensures that only one data slice 206 will return data 218 (218-0 to 218-3) to each core 102 at the same time. That is, the dispatch queue 204 dispatches requests 216 to the data slices 206 to ensure that there is no instance in which two or more data slices 206 return data 218 to the same one of the cores 102 at the same time on its respective interface 112, which would result in a collision. This is a tradeoff of a reduction in performance in exchange for a reduction in consumed die area relative to an embodiment in which additional interfaces 112 are included to allow a core 102 to receive data from multiple data slices 206 at the same time. In one embodiment, the dispatch queue 204 includes a single queue structure that holds requests by the cores 102 to access the UTSD LLC 106. In an alternate embodiment, the dispatch queue 204 includes a respective queue structure associated with each of the data slices 206 that holds core 102 requests destined for the respective data slice 206.

As may be observed, the UTSD LLC 106 is a phased shared cache. Generally speaking, a phased shared cache trades off increased latency in exchange for reduced power consumption, which is important for relatively large cache memories because they tend to consume a significant amount of power. However, the embodiments described herein advantageously potentially reduce the latency of the shared cache 106 by the cores 102 in the aggregate by slicing the cache line data storage into multiple data slices 206 and physically locating a local slice 206 close to its associated core 102 and biasing allocations for a core 102 toward its physically local slice 206. More specifically, the unified tag part 202 is accessed first in response to a core 102 request, and then the appropriate one of the data slices 206 is accessed based on the response from the unified tag part 202, as described below with respect to FIG. 6, for example. Because data in a given cache line is typically accessed by one core 102 and not by the other cores 102, and because the UTSD LLC 106 biases allocations toward the physically local data slice 206 of the core 102, and because the physically local slice 206 has lower latency than a conventional fixed latency shared unified data storage structure, the embodiments described herein may provide reduced access latency by multiple cores 102 from the UTSD LLC 106 as a whole, while retaining a high throughput quality of the UTSD LLC 106 and keeping its shared property among the cores 102.

Figure 3:
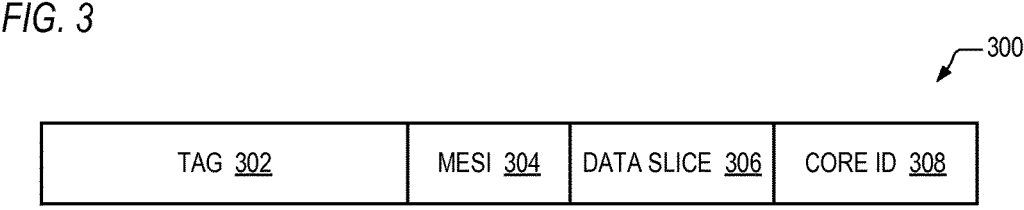
FIG. 3 is a block diagram illustrating an entry in the unified tag part.

Referring now to FIG. 3, a block diagram illustrating an entry 300 in the unified tag part 202 is shown. Although a single entry 300 is shown in FIG. 3, it should be understood that the entry 300 is representative of all the entries of the unified tag part 202. The entry 300 includes a tag 302 that holds the upper bits of the address of the corresponding cache line held in one of the data slices 206, e.g., bits not used to index into the sets of the UTSD LLC 106. The tag 302 is compared against the corresponding bits of the request address 212 to determine whether a hit occurred in the UTSD LLC 106. The entry 300 also includes cache status 304 of the corresponding cache line. In one embodiment, the cache status 304 corresponds to the well-known MESI (Modified-Exclusive-Shared-Invalid) protocol, although other data coherence protocols may be employed.

The entry 300 also includes a data slice indicator 306 that specifies which of the data slices 206 is currently holding the corresponding cache line of data. As described below, the dispatch queue 204 uses the data slice indicator 306 value obtained from the unified tag part 202 to determine which of the data slices 206 to access to read/write a cache line of data. The entry 300 also includes a core identifier (ID) field 308 that identifies the core 102 that caused the allocation and brought the current data into the cache line. Thus, each cache line may be classified as either a local cache line or a remote cache line. A cache line is local if it resides in the physically local slice 206 of the core 102 identified by the core identifier 308, whereas a cache line is remote if it resides in a physically remote slice 206 of the core 102 identified by the core identifier 308. The core identifier field 308 could be referred to when determining which ways or cache lines to allocate from within one data slice 206 using slice replacement bits 404, and the details will be described in FIG. 4.

Figure 4:
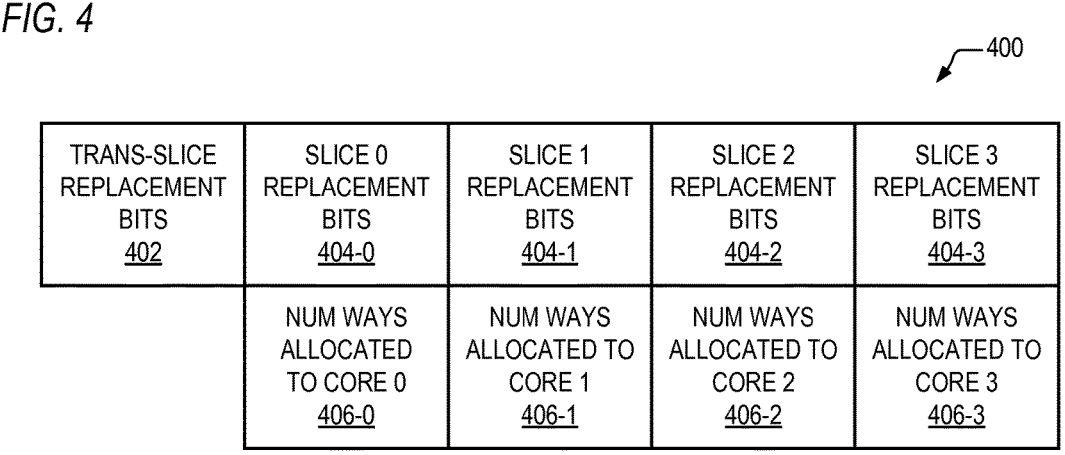
FIG. 4 is a block diagram illustrating replacement information of the UTSD LLC of FIG. 1.

Referring now to FIG. 4, a block diagram illustrating replacement information 400 of the UTSD LLC 106 of FIG. 1 is shown. The replacement information 400 is maintained for the UTSD LLC 106. In one embodiment, the replacement information 400 is stored in the unified tag part 202. In an alternate embodiment, the replacement information 400 is stored in a separate structure (not shown) of the UTSD LLC 106 that is accessed and arranged in a similar set-associative manner as the unified tag part 202.

The replacement information 400 includes trans-slice replacement bits 402. The UTSD LLC 106 uses the trans-slice replacement bits 402 to determine which of the data slices 206 to allocate an entry from. More specifically, in the case where the UTSD LLC 106 decides to allocate from a physically remote data slice 206 (e.g., at block 812 of FIG. 8), the UTSD LLC 106 uses the trans-slice replacement bits 402 to determine which of the physically remote data slices 206 to allocate from. Various methods for selecting a physically remote data slice 206 are contemplated. For example, in one embodiment, the physically remote data slice 206 is selected on a round-robin basis. In another embodiment, the physically remote data slice 206 is selected on a least-recently-used (LRU) or pseudo-least-recently-used (PLRU) basis. In another embodiment, the UTSD LLC 106 biases selection of the remote data slice 206 toward physically remote data slices 206 that have the lowest latency associated with the core 102 that caused the allocation relative to the other physically remote data slices 206. Thus, for example, assume: (1) core 0 102-0 caused the allocation; (2) the latency associated with data slice 1 206-1 providing data to core 0 102-0 is one clock cycle less than the latency associated with data slice 2 206-2 providing data to core 0 102-0; and (3) the latency associated with data slice 1 206-1 providing data to core 0 102-0 is two clock cycles less than the latency associated with data slice 3 206-3 providing data to core 0 102-0. In that case, the UTSD LLC 106 prefers to allocate from data slice 1 206-1 more than from data slice 2 206-2 or data slice 3 206-3, and prefers to allocate from data slice 2 206-2 more than from data slice 3 206-3.

The replacement information 400 also includes slice 0 replacement bits 404-0, slice 1 replacement bits 404-1, slice 2 replacement bits 404-2, and slice 3 replacement bits 404-3, which are collectively referred to as slice replacement bits 404 and generically individually referred to as slice replacement bits 404. Each slice replacement bits 404 (404-0, 404-1, 404-2, or 404-3) is used to select a way or a group of cache lines within the associated data slice 206 from which to allocate. Various methods for selecting the way are contemplated. For example, in one embodiment, the way is selected on a round-robin basis. In another embodiment, the way is selected on a LRU or PLRU basis. In another embodiment, if a cache miss happens and all ways have been occupied, in such a case, an eviction must be performed before an allocation. Each slice replacement bits 404 (404-0, 404-1, 404-2, or 404-3) selects the remote cache lines to evict according to the core identifier field 308.

The replacement information 400 also includes an indicator 406-0 that indicates the number of ways in the UTSD LLC 106 that are currently allocated to core 0 102-0, an indicator 406-1 that indicates the number of ways in the UTSD LLC 106 that are currently allocated to core 1 102-1, an indicator 406-2 that indicates the number of ways in the UTSD LLC 106 that are currently allocated to core 2 102-2, and an indicator 406-3 that indicates the number of ways in the UTSD LLC 106 that are currently allocated to core 3 102-3. The indicators 406-0, 406-1, 406-2 and 406-3 are collectively referred to as indicators 406 and generically individually referred to as indicator 406. The use of the replacement information 400 to allocate an entry in the UTSD LLC 106 is described in more detail below, particularly with respect to FIG. 8.

Figure 5:
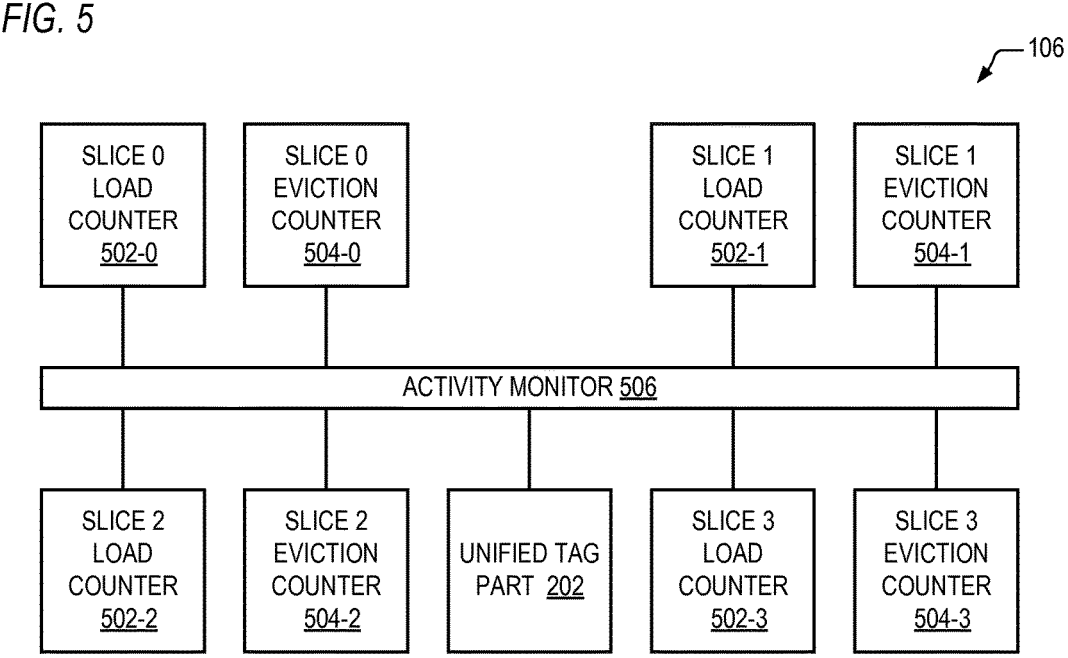
FIG. 5 is a block diagram illustrating in more detail the UTSD LLC of FIG. 1, including an activity monitor thereof.

Referring now to FIG. 5, a block diagram illustrating in more detail the UTSD LLC 106 of FIG. 1, including an activity monitor 506 thereof, is shown. The UTSD LLC 106 includes the activity monitor 506 and counters. The counters include a slice 0 load counter 502-0, a slice 1 load counter 502-1, a slice 2 load counter 502-2, and a slice 3 load counter 502-3, which are collectively referred to as slice load counters 502 and generically individually referred to as slice load counter 502. In one embodiment, each slice load counter 502 counts the number of read requests from its corresponding data slice 206. The read requests include requests from the core 102 to read data from its corresponding data slice 206. That is, each slice load counter 502 counts the number of read requests from the data slice 206. This could be preferably implemented if core 102 only reads data from but never writes data into the UTSD LLC 106. In another embodiment, if the core 102 reads data from and also writes data into the UTSD LLC 106, each slice load counter 502 counts the total number of access (read/write) requests to the data slice 206.

The counters also include a slice 0 eviction counter 504-0, a slice 1 eviction counter 504-1, a slice 2 eviction counter 504-2, and a slice 3 eviction counter 504-3, which are collectively referred to as slice evictions counters 504 and generically individually referred to as slice eviction counter 504. Each slice eviction counter 504 counts the number of cache line evictions from its corresponding data slice 206. If the count of the slice eviction counter 504 increases, this may indicate a corresponding increase in the number of times a miss occurred when writing to or reading from the corresponding data slice 206, and may indicate the memory space of the corresponding data slice 206 is not enough to hold the new cache lines. The new cache lines include, for example, the cache lines being written into the UTSD LLC 106 from the core 102 or cache lines being read from DRAM (e.g., the system memory, not shown in the figures), which requires the old cache lines to be written back to the system memory to release the occupied memory space. If data in the old cache lines is what a remote core 102 rather than the core 102 physically local to the data slice 206 also needs, the performance will be lowered if the old cache lines are written back to the system memory because the latency to access the system memory is longer than to access a physically remote data slice 206 for the remote core 102.

The activity monitor 506 receives the counts from the slice load counters 502 and slice eviction counters 504, as well as the responses from the unified tag part 202, including the replacement information 400 of FIG. 4. The activity monitor 506 uses the received information to determine which of the data slices 206 to allocate from. In particular, the activity monitor 506 decides whether to allocate from the core's 102 physically local slice 206 or from a physically remote slice 206 of the core 102, as described in more detail below, particularly with respect to FIG. 8, based on recent activity of the physically local slice 206. In one embodiment, the UTSD LLC 106 biases allocations caused by a core 102 toward its physically local slice 206. That is, the UTSD LLC 106 allocates from its physically local slice 206 unless a miss rate of the physically local slice 206 exceeds a threshold. In one embodiment, the miss rate is determined based on the counts from the slice load counters 502 and slice eviction counters 504 received by the activity monitor 506. If the miss rate of the physically local slice 206 exceeds a threshold, it may mean the core 102 corresponding to the physically local slice 206 is busy and allocating only from the physically local slice 206 cannot meet the requirements of the busy core. This will be described in more detail below, particularly with respect to FIG. 8.

Preferably, the counts in the slice load counters 502 and slice eviction counters 504 represent the number of accesses/evictions within a recent prior period to the time the allocation is required. For example, the counts may indicate the number of accesses/evictions within the most recent N clock cycles, wherein N is a configurable value. In one embodiment, a single saturating up-down counter per data slice 206 is initialized to a value that is half the maximum value of the counter, and the counter is incremented each time an eviction occurs and is decremented each time a hit occurs; if at the time an allocation is needed (e.g., at block 802 of FIG. 8) the counter has reached it its maximum value (or is above a predetermined value), then (e.g., at decision block 804 of FIG. 8) the UTSD LLC 106 decides the miss rate of the physically local data slice 206 is high enough to consider allocating from a physically remote data slice 206. Other embodiments are contemplated in which a high miss rate of the local data slice 206 is determined based on other measurements.

Figure 6:
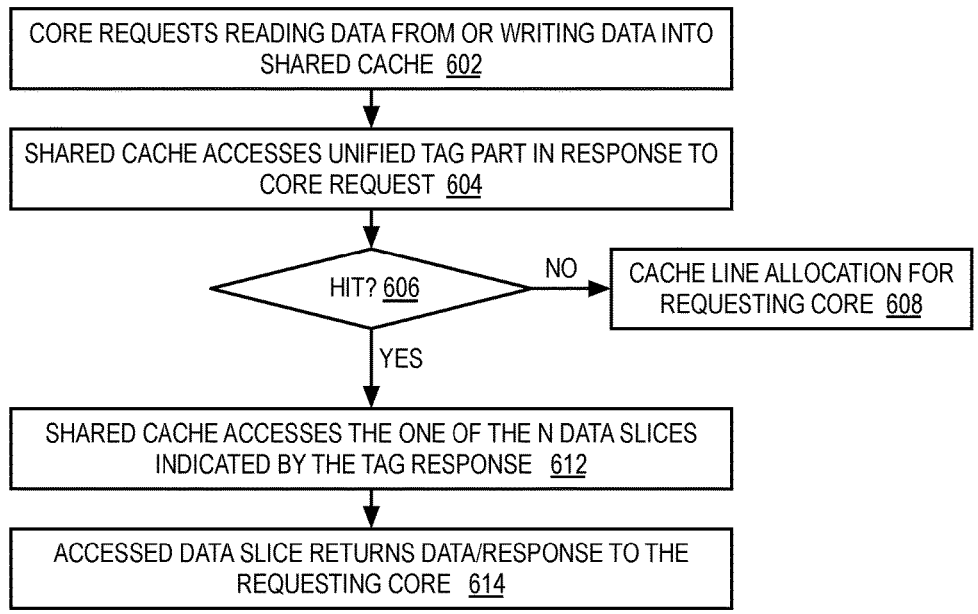
FIG. 6 is a flowchart illustrating operation of the processor of FIG. 1 to access the UTSD LLC.

Referring now to FIG. 6, a flowchart illustrating operation of the processor 100 of FIG. 1 to access the UTSD LLC 106 is shown. Flow begins at block 602.

At block 602, a core 102 requests to read data from or write data into the shared cache, or UTSD LLC 106. Flow proceeds to block 604.

At block 604, the shared cache, or UTSD LLC 106, accesses the unified tag part 202 in response to the core 102 request. Flow proceeds to decision block 606.

At decision block 606, the UTSD LLC 106 determines whether the address of the request hit in the unified tag part 202. If so, flow proceeds to block 612; otherwise, flow proceeds to block 608.

At block 608, the UTSD LLC 106 allocates cache lines for the requesting core 102. Typically, the UTSD LLC 106 biases allocations towards a physically local slice of the core, which is described in more detail with respect to FIG. 8. In one embodiment, a cache line allocation flow as described below in FIG. 8 will cause the UTSD LLC 106 to allocate cache lines to accommodate data read from DRAM (e.g., the system memory) when a read miss occurs or to allocate cache lines to accommodate data written from the core 102. In one embodiment, the UTSD LLC 106 further returns a miss response to the core 102. Flow ends at block 608.

At block 612, the UTSD LLC 106 determines from the information returned by the unified tag part 202 which of the data slices 206 is currently holding the cache line specified by the core 102 request. The UTSD LLC 106 then accesses the data slice 206 specified by the data slice indicator 306. In one embodiment, the UTSD LLC 106 determines which data slice 206 is currently holding the cache line from the data slice indicator 306 value. In an alternate embodiment, the UTSD LLC 106 makes the determination based on the information returned by the unified tag part 202 that indicates the hitting way and the way partitioning information, i.e., to which of the N data slices 206 the hitting way is partitioned. Flow proceeds to block 614.

At block 614, the accessed data slice 206 returns the requested data (when read) or a complete response (when write) to the requesting core 102. As described above, the latency associated with accessing the UTSD LLC 106 may vary depending upon which of the data slices 206 is accessed by the core 102. Advantageously, in cases where the core 102 is receiving data from its physically local data slice 206, the latency is minimized. More specifically, the latency is less than it would be in the case of a comparable conventional design having a unified storage structure for storing the cache lines of data having a fixed latency. Flow ends at block 614.

Figure 7:
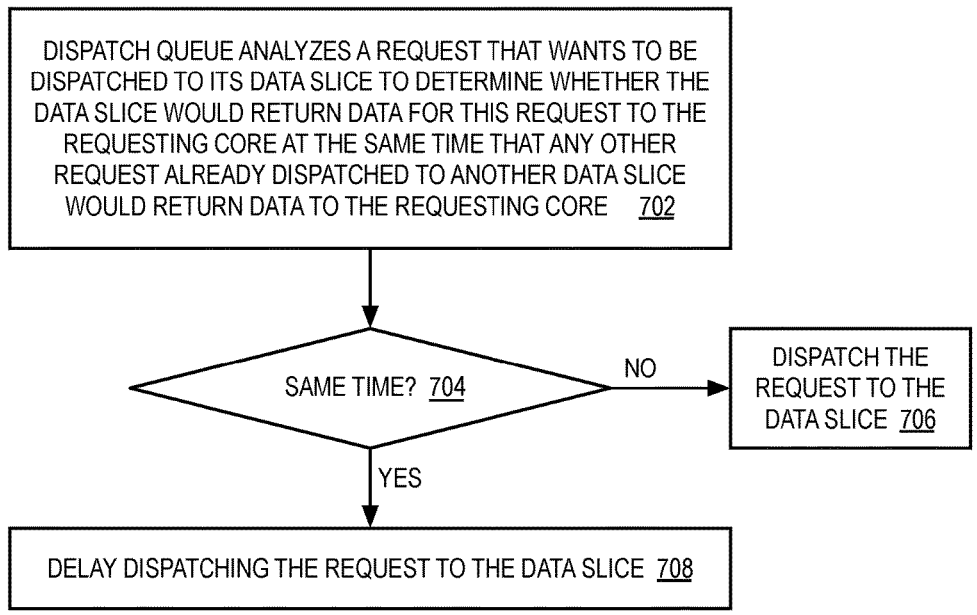
FIG. 7 is a flowchart illustrating operation of the dispatch queue of the UTSD LLC of FIG. 2.

Referring now to FIG. 7, a flowchart illustrating operation of the dispatch queue 204 of the UTSD LLC 106 of FIG. 2 is shown. At a given instance in time (e.g., during a clock cycle) in which the dispatch queue 204 is non-empty, the dispatch queue 204 sends requests from the cores 102 to the data slices 206. Preferably, the dispatch queue 204 is configured to dispatch at least one request to each of the data slices 206 concurrently, when possible. The dispatch queue 204 looks at its queued requests, preferably starting at the head of the queue, to determine which of the requests to dispatch to the data slices 206. FIG. 7 describes the process used by the dispatch queue 204 to make a determination whether to dispatch a given request. However, it should be understood that the dispatch queue 204 concurrently makes a similar determination for other queued requests so that, when possible, the dispatch queue 204 concurrently issues requests to more than one of the data slices 206, and preferably to all of the data slices 206 concurrently. Flow begins at block 702.

At block 702, the dispatch queue 204 analyzes a request that wants to be dispatched to a data slice 206, more specifically, to the data slice 206 specified by the data slice indicator 306 returned by the unified tag part 202 response 214. The request also specifies the core 102 requesting the data. The dispatch queue 204 determines whether the request would return data to the requesting core 102 at the same time (e.g., in the same clock cycle) that another data slice 206 would return data to the requesting core 102 due to a request that has already been dispatched to the other data slice 206. For example, assume the latency associated with the provision of data to core 0 102-0 from its physically local data slice 206 (data slice 0 206-0) is three clock cycles less than the latency associated with the provision of data to core 0 102-0 from a remote data slice 206 (e.g., data slice 3 206-3). Further, assume that three clock cycles earlier the dispatch queue 204 dispatched a request from core 0 102-0 to data slice 3 206-3, and now the dispatch queue 204 is analyzing a request from core 0 102-0 to data slice 0 206-0. In this case, the dispatch queue 204 would determine that the two data slices 206 would return data to core 0 102-0 at the same time if the dispatch queue 204 dispatched the request to data slice 0 206-0, i.e., a collision would occur on the interface 112-0 to core 0 102-0. Flow proceeds to decision block 704.

At decision block 704, if dispatching the request would cause the data slice 206 to return data at the same time as another data slice 206 to the requesting core 102, flow proceeds to block 708; otherwise, flow proceeds to block 706.

At block 706, the dispatch queue 204 dispatches the request to the specified data slice 206. Flow ends at block 706.

At block 708, the dispatch queue 204 delays dispatching the request to the specified data slice 206. Eventually (e.g., in a subsequent clock cycle), the dispatch queue 204 will dispatch the request to the data slice 206. As discussed above, although the dispatch queue 204 does not dispatch the request, the dispatch queue 204 may presently dispatch a different queued request to the data slice 206, specifically a request that was made by a different core 102. Flow ends at block 708.

As may observed from the operation of the UTSD LLC 106 according to FIG. 7, the dispatch queue 204 dispatches requests to the data slices 206 in a scheduled fashion so that, for each core 102, only one of the data slices 206 at a time returns data to the core 102, although multiple cores 102— including all the cores 102—may receive data from a different data slice 206 at the same time.

Figure 8:
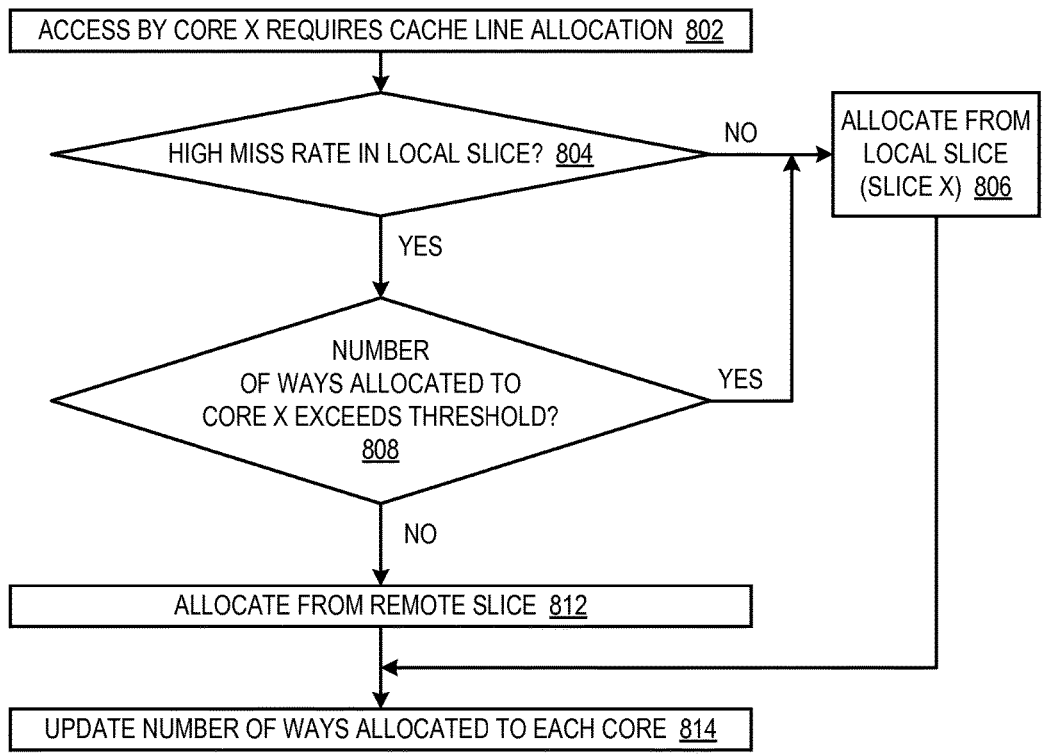
FIG. 8 is a flowchart illustrating operation of the UTSD LLC of FIG. 1 to perform an allocation.

Referring now to FIG. 8, a flowchart illustrating operation of the UTSD LLC 106 of FIG. 1 to perform an allocation is shown. Flow begins at block 802.

At block 802, the UTSD LLC 106 determines that it needs to allocate an entry for a cache line, typically in response to a miss in the UTSD LLC 106. A miss happens in several situations. For example, a write miss happens when receiving a write request from a core 102 to write data into the UTSD LLC 106 and there is no cache line of the UTSD LLC 106 corresponding to the request address 212, and a new cache line is allocated to accommodate the new data from core 102. For another example, a read miss happens when receiving a read request from a core 102 to read data from the UTSD LLC 106 and there is no cache line of the UTSD LLC 106 corresponding to the request address 212, and a new cache line is allocated to accommodate the data read from the DRAM (e.g., the system memory). In one embodiment where core 102 only reads data from but never writes data into the UTSD LLC 106, the miss only means read miss. The need to allocate an entry was caused by a request made by one of the cores 102, referred to here as core X. Flow proceeds to decision block 804.

At decision block 804, the activity monitor 506 of FIG. 5 determines whether the miss rate of core X's physically local data slice 206 is high. In one embodiment, the miss rate of core X's physically local data slice 206 is high if the ratio of the values of the slice eviction counter 504 and the slice load counter 502 associated with core X exceeds a predetermined threshold. If the ratio exceeds the predetermined threshold, this may be an indication that the ways of the physically local data slice 206 cannot satisfy the current demands by core X such that more ways (i.e., ways from remote data slices 206) should be allocated. Other embodiments for determining whether the miss rate of core X's local data slice 206 is high are described above. Advantageously, even though the latency associated with the provision of data to core X from the remote data slices 206 is greater than the latency associated with the provision of data to core X from its physically local data slice 206, it may be that performance is improved by allocating from a remote data slice 206 in such cases because if the evicted cache lines are once requested by a remote core 102 (e.g., core Y) rather than the core X, it will be efficient for the core Y to read the cache lines (if not evicted) from core X's physically local data slice 206 than to read them from the system memory. If the miss rate of the local data slice 206 is high, flow proceeds to decision block 808; otherwise, flow proceeds to block 806.

At block 806, the UTSD LLC 106 allocates from core X's local data slice 206. Flow proceeds to block 814.

At decision block 808, the UTSD LLC 106 determines whether the number of ways of the UTSD LLC 106 already allocated to core X exceeds a threshold value, which is preferably configurable. In one embodiment, the number of ways of the UTSD LLC 106 is 16 and the threshold number of ways is 7 by default. In one embodiment wherein the UTSD LLC 106 is set-associatively arranged, the number of ways in the indexed set already allocated to core X is determined from the indicator 406 of FIG. 4 associated with core X. In an alternate embodiment, the indicators 406 that indicate the number of ways allocated to each core 102 are not present; instead, the number of ways allocated to core X in the indexed set is determined by counting the number of ways (entries) in the set whose core identifier 308 value matches the core identifier of core X. If the number of ways allocated to core X in the indexed set exceeds the threshold, flow proceeds to block 806; otherwise, flow proceeds to block 812. It should be noted that block 808 is an optional step and could be omitted in some other embodiments.

Figure 9:
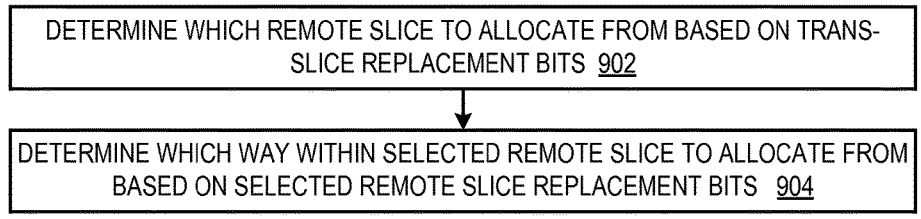
FIG. 9 is a flowchart illustrating operation of the UTSD LLC of FIG. 1 to perform an allocation from a remote data slice.

At block 812, the UTSD LLC 106 allocates from a remote data slice 206 of core X, which is described in more detail with respect to FIG. 9. Flow proceeds to block 814.

At block 814, the UTSD LLC 106 updates each of the indicators 406 of FIG. 4 to indicate the number of ways allocated to each core 102. It is noted that the indicators 406 may be updated when an entry in the UTSD LLC 106 is invalidated. Additionally, the core identifier 308 is updated with the core identifier value of core X. Flow ends at block 814.

Referring now to FIG. 9, a flowchart illustrating operation of the UTSD LLC 106 of FIG. 1 to perform an allocation from a remote data slice 206 is shown. In particular, FIG. 9 describes the operation at block 812 of FIG. 8 in more detail. Flow begins at block 902.

At block 902, the UTSD LLC 106 determines which remote data slice 206, of the core 102 that caused the allocation, to allocate from. Preferably, the UTSD LLC 106 does so based on the trans-slice replacement bits 402 of FIG. 4. In one embodiment, when the UTSD LLC 106 allocates from a remote slice 206 at block 812 of FIG. 8, the remote slice replacement policy biases toward a remote slice 206 that has the lowest latency for the allocating core 102 relative to the other remote slices 206. Flow proceeds to block 904. In another embodiment, the physically remote data slice 206 is selected on a round-robin basis according to the trans-slice replacement bits 402. In another embodiment, the physically remote data slice 206 is selected on a LRU or PLRU basis according to the trans-slice replacement bits 402.

At block 904, the UTSD LLC 106 determines which way within the remote data slice 206 selected at block 902 to allocate from based on the replacement bits 404 of FIG. 4 associated with the selected data slice 206. Flow ends at block 904.

In one embodiment, a processor of the invention comprises: N cores, wherein N is an integer greater than one, and a cache memory set-associatively arranged as M ways, wherein M is an integer at least as great as N, wherein the cache memory is shared by the N cores. The cache memory comprises: a unified tag part that maintains data coherency among the N cores. For each way of the M ways and each core of the N cores, the way has a latency associated with providing data to the core. The associated latency varies among different combinations of the M ways and N cores, and for each core of the N cores, the cache memory biases allocations caused by the core towards ways of the M ways that have a lowest latency associated with providing data to the core. The M ways are partitioned into a plurality of data slices, wherein each data slice of the plurality of data slices is located physically closer to one of the N cores than to any of the other N-1 cores and has a smaller latency associated with providing data to the one of the N cores than to any of the other N-1 cores. The cache memory further comprises a dispatch queue, wherein the dispatch queue dispatches requests to the N data slices in a scheduled fashion so that, for each core of the N cores, only one of the N data slices at a time returns data to the core.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A cache memory shared by N cores, the cache memory comprising:
   a unified tag part; and
   a sliced data part, wherein the sliced data part is partitioned into N data slices, wherein each data slice of the N data slices is physically local to a respective one of the N cores and physically remote from the other N-1 cores, wherein N is an integer greater than one;
   wherein for each core of the N cores, the cache memory biases allocations caused by the core towards a physically local slice of the core, wherein the physically local slice is one of the N data slices and is physically local to the core; and
   wherein to bias the allocations towards the physically local slice of the core, when an address of a request from the core misses in the unified tag part, the cache memory allocates from the physically local slice of the core, unless a miss rate of the physically local slice exceeds a threshold.

2. The cache memory of claim 1, wherein in response to a request from a core of the N cores for data from the cache memory, the cache memory first accesses the unified tag part to determine whether an address of the request hit in the unified tag part, and subsequently accesses the one of the N data slices if the address of the request hits in the unified tag part.

3. The cache memory of claim 1, wherein for each data slice of the N data slices, a latency for the data slice to return data to the core to which the data slice is physically local is smaller than a latency for the data slice to return data to the other N-1 cores to which the data slice is physically remote.

4. The cache memory of claim 1, wherein the miss rate comprises a ratio of a count of evictions from the physically local slice and a count of access requests to the physically local slice.

5. The cache memory of claim 1,
   wherein the cache memory is arranged as a set-associative cache memory having M ways; and
   wherein to bias the allocations towards the physically local slice of a core, the cache memory allocates from the physically local slice of the core, unless the miss rate of the physically local slice exceeds a first threshold and a number of the M ways that are already allocated to the core does not exceed a second threshold.

6. The cache memory of claim 1,
wherein the cache memory is arranged as a set-associative cache memory having M ways, wherein the M ways are partitioned among the N data slices;
wherein the cache memory maintains a-first replacement information data associated with the N data slices, and maintains N second replacement information data associated with a respective one of the N data slices;
wherein when performing an allocation for one of the N cores from one of its physically remote data slices, the cache memory uses the first replacement information data to select one of the physically remote data slices for the allocation; and
wherein the cache memory uses one of the N second replacement information data associated with the selected one of the physically remote data slices to select one of the M ways partitioned to the selected one of the physically remote data slices to allocate from.

7. The cache memory of claim 1, further comprising:
a dispatch queue that dispatches requests to the N data slices in a scheduled fashion so that, for each core of the N cores, only one of the N data slices at a time returns data to the core.

8. The cache memory of claim 7,
wherein the unified tag part provides an indication of which one of the N data slices is currently holding data requested by one of the N cores; and
wherein the dispatch queue dispatches a request for the data to the one of the N data slices identified by the indication.

9. A method for use with a cache memory shared by N cores, the cache memory comprising a unified tag part and a sliced data part, wherein the sliced data part is partitioned into N data slices, wherein each data slice of the N data slices is physically local to a respective one of the N cores and physically remote from the other N-1 cores, wherein N is an integer greater than one, the method comprising:
in response to a request from a core of the N cores for data from the cache memory, first accessing the unified tag part to determine whether an address of the request hit in the unified tag part;
subsequently accessing one of the N data slices if the address of the request hits in the unified tag part;
returning the data to the requesting core from the accessed one of the N data slices with an access latency that is smaller when the accessed one of the N data slices is physically local to the core than when the accessed one of the N data slices is physically remote from the core;
biasing allocations caused by the core towards a physically local slice of the core, wherein the physically local slice is one of the N data slices and is physically local to the core; and
said biasing allocations comprises allocating from the physically local slice of the core when an address of a request from the core misses in the unified tag part, unless a miss rate of the physically local slice exceeds a threshold.

10. The method of claim 9, wherein the miss rate comprises a ratio of a count of evictions from the physically local slice and a count of access requests to the physically local slice.

11. The method of claim 9, wherein the cache memory is arranged as a set-associative cache memory having M ways, wherein said biasing the allocations towards the physically local slice of the core comprises:
allocating from the physically local slice of the core, unless the miss rate of the physically local slice exceeds a first threshold and a number of the M ways that are already allocated to the core does not exceed a second threshold.

12. The method of claim 9, wherein the cache memory is arranged as a set-associative cache memory having M ways, wherein the M ways are partitioned among the N data slices, the method further comprising:
maintaining s-first replacement information data associated with the N data slices, and maintaining N second replacement information data associated with a respective one of the N data slices; and
performing an allocation for the core from one of its physically remote data slices by:
using the first replacement information data to select one of the physically remote data slices for the allocation; and
using one of the N second replacement information data associated with the selected one of the physically remote data slices to select one of the M ways partitioned to the selected one of the physically remote data slices to allocate from.

13. The method of claim 9, further comprising:
dispatching requests to the N data slices in a scheduled fashion so that, for each core of the N cores, only one of the N data slices at a time returns data to the core.

14. A processor, comprising:
N cores, wherein N is an integer greater than one; and
a cache memory set-associatively arranged as M ways, wherein M is an integer at least as great as N, wherein the cache memory is shared by the N cores, wherein the cache memory comprises:
a unified tag part for maintaining data coherency among the N cores;
wherein for each way of the M ways and each core of the N cores, the way has a latency associated with providing data to the core, wherein the associated latency varies among different combinations of the M ways and N cores;
wherein for each core of the N cores, the cache memory biases allocations caused by the core towards ways of the M ways that have a lowest latency associated with providing data to the core; and
wherein to bias the allocations towards the ways that have the lowest latency, when an address of a request from the core misses in the unified tag part, the cache memory allocates from the ways that have the lowest latency, unless a miss rate of the ways that have the lowest latency exceeds a threshold.

15. The processor of claim 14, wherein the M ways are partitioned among a plurality of data slices, wherein each data slice of the plurality of data slices is located physically closer to one of the N cores than to any of the other N-1 cores and has a smaller latency associated with providing data to the one of the N cores than to any of the other N-1 cores.

16. The processor of claim 15, wherein the cache memory further comprises a dispatch queue, wherein the dispatch queue dispatches requests to the N data slices in a scheduled fashion so that, for each core of the N cores, only one of the N data slices at a time returns data to the core.

* * * * *